United States Patent
Lemaire et al.

(10) Patent No.: US 9,798,136 B2
(45) Date of Patent: Oct. 24, 2017

(54) METHOD FOR CONTROLLING THE POSITION OF A MEMS MIRROR

(71) Applicant: INTEL CORPORATION, Santa Clara, CA (US)

(72) Inventors: Martin Lemaire, Besancon (FR); Thierry Barras, Gilly (CH); Nicolas Abele, Demoret (CH)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/024,740

(22) PCT Filed: Oct. 7, 2013

(86) PCT No.: PCT/EP2013/070840
§ 371 (c)(1),
(2) Date: Mar. 24, 2016

(87) PCT Pub. No.: WO2015/051820
PCT Pub. Date: Apr. 16, 2015

(65) Prior Publication Data
US 2016/0231557 A1    Aug. 11, 2016

(51) Int. Cl.
*G02B 26/08*    (2006.01)
*G02B 7/00*    (2006.01)

(52) U.S. Cl.
CPC ........... *G02B 26/085* (2013.01); *G02B 7/008* (2013.01)

(58) Field of Classification Search
CPC ...... G02B 26/10; G02B 26/101; G02B 26/08; G02B 26/0816; G02B 26/0833;
(Continued)

(56) References Cited

U.S. PATENT DOCUMENTS

2005/0122604 A1*  6/2005  Kamiya ............. G02B 26/0833
                                                         359/224.1
2007/0026614 A1    2/2007  Choo et al.
(Continued)

FOREIGN PATENT DOCUMENTS

WO    2011/095231 A1    8/2011

OTHER PUBLICATIONS

International Search Report in International Patent Application No. PCT/EP2013/070840 dated Jun. 5, 2014.

*Primary Examiner* — Euncha Cherry

(57) ABSTRACT

According to the present invention there is provided a method of controlling the position of a MEMS mirror in a MEMS device, wherein the MEMS device comprises, a MEMS mirror, a magnet which provides a magnetic field (B), an actuating means which operatively cooperates with the MEMS mirror so that it can apply a force to the MEMS mirror which can tilt the MEMS mirror about at least one rotational axis when the actuating means is provided with a drive signal, wherein the magnitude force applied by the actuating means to the MEMS mirror is dependent on the amplitude of the drive signal, and a detection coil which is mounted on the MEMS mirror, the method comprising the steps of, detecting a change in the resistance (R) of the detection coil so as to detect a change in temperature of the MEMS mirror; determining the drive signal amplitude required to maintain the MEMS mirror at a predefined angular position (Θ); providing the actuating means with a drive signal which has an amplitude which is equal to the determined drive signal amplitude.

19 Claims, 5 Drawing Sheets

(58) Field of Classification Search
CPC .. G02B 26/0841; G02B 26/085; G02B 7/008; B81B 3/00; B81B 3/0043; B81B 2201/042
USPC ............ 359/212.1–214.1, 223.1–226.1
See application file for complete search history.

(56) References Cited

U.S. PATENT DOCUMENTS

| | | |
|---|---|---|
| 2008/0239445 A1 | 10/2008 | Ando |
| 2008/0273230 A1* | 11/2008 | Kadowaki .......... G02B 26/0841 359/199.1 |
| 2013/0093525 A1 | 4/2013 | Le Phan et al. |
| 2015/0288268 A1* | 10/2015 | Gamet ............... G02B 26/0833 359/213.1 |

* cited by examiner

| Θ | $R_{coil}$ | $I_{drive}$ |
|---|---|---|
| 20° | 100Ω | 15mA |
| ... | ... | ... |
| ... | ... | ... |
| ... | ... | ... |
| ... | ... | ... |
| ... | ... | ... |
| ... | ... | ... |

Fig. 4

METHOD FOR CONTROLLING THE POSITION OF A MEMS MIRROR

FIELD OF THE INVENTION

The present invention relates to, a method for controlling the position of a MEMS mirror in a MEMS mirror device and in particularly, to a method which compensates for changes in the angular position of the MEMS mirror which occur due to temperature changes in the MEMS mirror.

DESCRIPTION OF RELATED ART

A MEMS micro-mirror device is a device that contains an optical MEMS (Micro-Electrical-Mechanical-System). The optical MEMS micro-mirror device may comprise an elliptical, cylindrical, rectangular, square or random shape micro-mirror that is adapted to move and to deflect light over time. The micro-mirror is connected by torsional arms to a fixed part and can tilt and oscillate along one or two axis. For example it can oscillate vertically and horizontally. Different actuation principles can be used, including electrostatic, thermal, electro-magnetic or piezo-electric. MEMS micromirror devices are known in which the area of these micromirrors are around a few mm². In this case, the dimensions of the MEMS micro-mirror device, comprising the packaging, is around ten mm². This MEMS micro-mirror device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete system.

A typical application of the MEMS micro-mirror devices is for optical scanning and projection systems. In a projection system, a 2-D or 3-D image or video can be displayed on any type of projection surface. In a colour system, each pixel of the image is generated by combining modulated red, green and blue laser light, by means of, for example, a beam combiner, to generate a combined light beam which defines a pixel of the image or video. The MEMS micro-mirror in the MEMS micro-mirror device directs the combined light beam to a projection surface where the pixel of the image or video is displayed. Successive pixels of the image or video are display in this manner. By means of its oscillations, the MEMS micro-mirror within the MEMS micro-mirror device will continuously scan the combined light beam from left to right and from top to bottom (or according to a different trajectory including e.g. Lissajou trajectories) so that all the pixels of the image, or video, are displayed on the projection surface, successively, pixel-by-pixel. The MEMS micro-mirror will oscillate about its oscillation axes at a frequency which ensures that the combined light beam is scanned across the projection surface at such a speed that a complete image is visible to a person viewing.

Typically, the MEMS micro-mirror in a MEMS micromirror device is able to oscillate along a single oscillation axis. Therefore, in order to display a 2-D image on a screen a projection system will require two MEMS micro-mirror devices; a first MEMS micro-mirror device which is required to scan the combined light beam along the horizontal and a second MEMS micro-mirror device which is required to scan the combined light beam along the along the vertical. Alternatively the MEMS micro-mirror in a MEMS micro-mirror device could be configured such that it can be oscillated about two orthogonal oscillation axes.

The MEMS micro-mirror devices described above are dynamically operated MEMS micro-mirror devices, in the sense that during operation the MEMS micro-mirror continuously oscillates about its oscillation axis/axes during use. An alternative MEMS micro-mirror device includes a static operated MEMS micro-mirror device; in static operated MEMS micro-mirror devices the MEMS micro-mirror does not oscillate continuously about its oscillation axis/axes. On the contrary in static operated MEMS micro-mirror devices the MEMS micro-mirror is tilted about its oscillation axis/axes to a predefined angular position; the MEMS micro-mirror remains at this predefined angular position.

It will be understood that each of the MEMS micro-mirror devices shown in FIGS. 1 and 2 could be operated as a dynamic MEMS micro-mirror device or a static operated MEMS micro-mirror device. If operated as a dynamic MEMS micro-mirror device the MEMS micro-mirror is continuously oscillated about its oscillation axis/axes and if operated as a static MEMS micro-mirror device the MEMS micro-mirror is tilted about its oscillation axis/axes to a predefined angular position and the MEMS micro-mirror remains at this predefined angular position.

Referring now to FIGS. 1a and 1b which show a known MEMS micro-mirror device 1. FIG. 1a provides a plan view of the MEMS micro-mirror device 1 and FIG. 1b shows a cross sectional view of the MEMS micro-mirror device 1, taken along A-A' of FIG. 1a.

The MEMS micro-mirror device 1 comprises a first support frame 2. A first torsional arm 3a and second torsional arm 3b connect a MEMS micro mirror 4 to the support frame 2. In this embodiment the support frame 2 is fixed (i.e. immovable). The first and second torsional arms 3a,b define a first oscillation axis 7 for the MEMS micro mirror 4. A first conduction coil 5 is supported on, and connected to, the MEMS micro mirror 4. The first conduction coil 5 is arranged to extend, from a first electrical contact 9a which is located on the support frame 2, along the first torsional arm 3a, around the perimeter of the MEMS micro mirror 4 and back along the first torsional arm 3a to a second electrical contact 9b which is located on the support frame 2. In the MEMS micro-mirror device 1 the conduction coil is shown to be arranged to have one turn on MEMS micro mirror 4; it will be understood that the conduction coil may extend around the MEMS micro mirror 4 any number of times so as to define any number of turns on the MEMS micro mirror 4.

Collectively, the first support frame 2, first and second torsional arms 3a,b and the MEMS micro mirror 4, and first conduction coil 5, define collectively what is referred to as a MEMS die 10. As shown in FIG. 1b the MEMS die 10 is arranged in cooperation with a magnet 6 such the first conduction coil 5 is submerged in the magnetic field 'B' generated by the magnet 6.

During use an electric current 'I' is passed through the first conduction coil 5. As the first conduction coil 5 is submerged in the magnetic field 'B' created by the magnet 6, the conduction coil 5 will provide a Laplace force which will be applied to the MEMS micro mirror 4. The Laplace force will cause the MEMS micro mirror 4 to move about its first oscillation axis 7.

If it is desired to operate the MEMS micro-mirror device 1 as a dynamic MEMS micro-mirror device, then the electric current 'I' which is passed through the first conduction coil 5 is configured for example to be sinuous or square, so that the MEMS micro-mirror 4 is continuously oscillated about its first oscillation axis 7. If it is desired to operate the MEMS micro-mirror device 1 as a static MEMS micromirror device then the electric current 'I' which is passed through the first conduction coil 5 is configured to be a constant value so that the MEMS micro-mirror 4 is tilted about its first oscillation axis 7 to a predefined angular position and the MEMS micro-mirror 4 remains at this predefined angular position; the amount the MEMS micro-mirror 4 is tilted is dependent on the amplitude of the constant value electric current 'I' which is passed through the first conduction coil 5.

It should be understood that the MEMS micro-mirror device 1 could alternatively be configured to enable movement of the MEMS micro mirror 4 about two orthogonal axes. Such enables that the MEMS micro mirror 4 can scan light in two dimensions (typically along the horizontal and vertical) when the device is operated as a dynamic MEMS micro-mirror device. FIG. 2 shows a MEMS micro-mirror device 100 which is configured to enable movement of the MEMS micro mirror 4 about two orthogonal axes.

The MEMS micro-mirror device 20 has many of the same features of the MEMS micro-mirror device 1 shown in FIGS. 1a and 1b; however in the MEMS micro-mirror device 20 the support frame 2 is configured to be moveable; the support frame 2 is configured such that it can oscillate about a second oscillation axis 17, which is orthogonal to the first oscillation axis 7.

The MEMS micro-mirror device 20 further comprises a fixed part 12 (i.e. an immovably part); the support frame 2 is connected to the fixed part 12 via third and fourth torsional arms 13a,b. The third and fourth torsional arms 13a,b, define the second oscillation axis 17. A second conduction coil 15 is connected to the support frame 2. This second conduction coil 15 will also be submerged by the magnetic field 'B' generated by the magnet 6.

A second conduction coil 15 is supported on, and connected to, the support frame 2. The second conduction coil 15 is arranged to extend, from a first electrical contact 19a which is located on the fixed part 12, along the third torsional arm 13a, around the perimeter of the support frame 2 and back along the third torsional arm 13a to a second electrical contact 19b which is located on the fixed part 12. In the MEMS micro-mirror device 100 the second conduction coil 15 is shown to be arranged to have one turn on support frame 2; it will be understood that the conduction coil may extend around the support frame 2 any number of times so as to define any number of turns on the support frame 2.

Furthermore, in the MEMS micro-mirror device 20 the first and second electrical contacts 9a,9b for the first conduction coil 5 are located on the fixed part 12, and thus the first conduction coil 5 is arranged to also extend along the support frame 2 and the third and fourth torsional arms in order to electrically connect to the first and second electrical contacts 9a,9b.

During use an electric current 'i' is passed through the first conduction coil 5 which is connected to the MEMS micro mirror 4. As the first conduction coil 5 is submerged in the magnetic field 'B' created by the magnet 6 the first conduction coil 5 will provide a Laplace force which will be applied to the MEMS micro mirror 4. The Laplace force will cause the MEMS micro mirror 4 to move about the first oscillation axis 7. An electric current 'I' is also passed through the second conduction coil 15 which is connected to the support frame 2. As the second conduction coil 15 is also submerged in the magnetic field 'B' created by the magnet 6, the second conduction coil 15 will provide a Laplace force which will be applied to the support frame 2. The Laplace force which is applied to the support frame 2 by the second conduction coil 15 will cause the support frame 2, and thus the MEMS micro mirror 4 which is connected to the support frame 2 via the torsional arms 13a,b, to move about the second oscillation axis 17. Accordingly the MEMS micro mirror 4 will be moved about the first and second orthogonal oscillation axes 7,17.

If it is desired to operate the MEMS micro-mirror device 20 as a dynamic MEMS micro-mirror device, then the electric currents 'i' 'I' which are passed through the first and second conduction coils 5,15 respectively, are each configured for example to be sinuous or square, so that the MEMS micro-mirror 4 is continuously oscillated about its first and second oscillation axes 7,17. If the MEMS micro-mirror device 20 is operated as a dynamic MEMS micro-mirror device, and if the MEMS micro mirror 4 reflects light as it is oscillating about the first and second orthogonal oscillation axes 7,17, light reflected by the MEMS micro-mirror 4 will be scanned in two dimensions e.g. horizontal and vertical. This will, for example, enable combined light beams which the MEMS micro mirror 4 receives, to be scanned across the area of a projection screen in, for example, a zig-zag pattern.

If it is desired to operate the MEMS micro-mirror device 20 as a static MEMS micro-mirror device then the electric currents 'i' 'I' which are passed through the first and second conduction coils 5,15 respectively, are each configured to be constant values so that the MEMS micro-mirror 4 is tilted about its first and second oscillation axes 7,17 to a predefined angular position and the MEMS micro-mirror 4 remains at this predefined angular position; the amount the MEMS micro-mirror 4 is tilted is dependent on the amplitude of the constant value electric currents 'i' 'I' which are passed through the first and second conduction coils 5,15 respectively.

In each of the above-mentioned MEMS micro-mirror device 1,20 the temperature of the MEMS micro-mirror 4 can change during use. The temperature variation in the MEMS micro-mirror 4 can arise due to many factors; for example, the temperature of MEMS micro-mirror 4 may be increased by the first conduction coil 5 which is located on the MEMS micro-mirror 4 and which heats when conducting the actuation current; the MEMS micro-mirror 4 temperature may vary due to variation in the ambient temperature; the temperature of MEMS micro-mirror 4 may be increased by the laser light which the MEMS micro-mirror 4 reflects; movement of the MEMS micro-mirror 4 about its oscillation axis/axes may cool the MEMS micro-mirror 4. The variation in the temperature of the MEMS micro-mirror 4 will affect the properties of the MEMS micro-mirror 4; in particular the variation in the temperature of the MEMS micro-mirror 4 will affect the stiffness of the MEMS micro-mirror 4.

If the MEMS micro-mirror device 1,20 is operated as a static MEMS micro-mirror device, then the changes in the properties of the MEMS micro-mirror 4 will result in the MEMS micro-mirror 4 moving from its predefined angular position. For example, consider MEMS micro-mirror device 1 is operated as a static MEMS micro-mirror device, and a constant current of 10 milliAmps is provided in the first conduction coil 5 to move the MEMS micro-mirror 4 to a predefined angular position of 30° relative to the horizontal normal plane; after some time the temperature of the MEMS micro-mirror 4 may increase (e.g. MEMS micro-mirror 4 is heated by the first conduction coil 5) resulting the stiffness of the MEMS micro-mirror 4 decreasing. As the stiffness of the MEMS micro-mirror 4 decreases, and 10 milliAmps continues to be provided in the first conduction coil 5, the MEMS micro-mirror 4 may move to 35° relative to the horizontal normal i.e. the MEMS micro-mirror 4 will tend to become displaced from its predefined angular position.

It will also be understood that during use the temperature of the magnet 6 in the MEMS micro-mirror device 1,20 may vary. A variation in the temperature of the magnet 6 will affect the magnitude of the magnetic field which is provided by the magnet. A change in the magnetic field will result in a change in the Laplace force which is applied to the MEMS micro-mirror 4 which thus can affect the angular positioning of the MEMS micro-mirror 4.

It is an aim of the present invention to obviate or mitigate at least some of the above-mentioned disadvantages.

BRIEF SUMMARY OF THE INVENTION

According to the invention, there is provided a method of controlling the position of a MEMS mirror in a MEMS device, wherein the MEMS device comprises, a MEMS mirror, a magnet which provides a magnetic field (B), an actuating means which operatively cooperates with the MEMS mirror so that it can apply a force to the MEMS mirror which can tilt the MEMS mirror about at least one rotational axis when the actuating means is provided with a drive signal, wherein the magnitude force applied by the actuating means to the MEMS mirror is dependent on the amplitude of the drive signal, and a detection coil which is mounted on the MEMS mirror, the method comprising the steps of, detecting a change in the resistance (R) of the detection coil so as to detect a change in temperature of the MEMS mirror; determining the drive signal amplitude required to maintain the MEMS mirror at a predefined angular position ($\Theta$); providing the actuating means with a drive signal which has an amplitude which is equal to the determined drive signal amplitude.

The drive signal may be a current drive signal or a voltage drive signal.

Preferably the actuating means is configured so that the force it applies to the MEMS mirror is depends on the amplitude of the drive signal which is provided to the actuating means. An increase in the drive signal causes an increase in the force applied to the MEMS mirror. For example, in the case of electrostatic actuation the relationship between the amplitude of the drive signal (V) and the force applied to the MEMS mirror is given as:

$$F = \frac{1}{2}\frac{nt\epsilon\epsilon V^2}{d}$$

Thus, the angular position of the MEMS mirror is dependent on the amplitude of the drive signal which is provided to the actuating means.

The drive signal may take any suitable form; typically the drive signal is a current or a voltage.

It will be understood that the drive signal which is provided to the actuating means may have a constant amplitude or a varying amplitude (e.g. a sinusoidal drive signal). If the drive signal is of a constant amplitude then the force applied by the actuating means to the MEMS mirror will be constant and the MEMS mirror will be tilted to the predefined angular position ($\Theta$) and will remain static at this position until a further temperature change in the MEMS mirror occurs. If the drive signal is of a varying amplitude (e.g. if the drive signal is a sinusoidal drive signal) then the force applied by the actuating means to the MEMS mirror will vary (e.g. sinusoidally) such that the MEMS mirror will oscillate about its rotational axis, at the maximum amplitude of oscillation the MEMS mirror will be in the predefined angular position ($\Theta$). Thus, maintaining the MEMS mirror at a predefined angular position ($\Theta$) includes, maintaining the MEMS mirror at a static predefined angular position ($\Theta$), and/or maintaining the amplitude of oscillation of the MEMS mirror such that at the maximum amplitude of oscillation the MEMS mirror is at the predefined angular position ($\Theta$).

It should be understood that the force which is applied by the actuating means to the MEMS mirror is: a Laplace force in the case of magnetically actuated MEMS mirror; an electrostatic force, in the case of electrostatically actuated MEMS mirror; or a piezoelectric force, in the case of piezo-electrically actuated MEMS mirror.

If the drive signal is of varying amplitude then preferably the frequency of the drive signal is chosen such that no ringing or parasitic mechanical motion occurs when the MEMS mirror oscillates.

The actuating means may comprise a conduction coil which conducts a drive current (I) in the magnetic field, so that a Laplace force is applied to the MEMS mirror, and wherein the drive current (I) defines the drive signal.

Alternatively the actuating means may comprise electrostatic material, piezo-electric material and or thermal material. A thermal MEMS actuator is typically composed by an heating source, and whether a mechanical piece which is composed by two or more materials with different thermal expansion or a mechanical piece with just one material but which is heated an anisotropic way or a combination of that two systems and once heated, the stress between the two material due to their different thermal expansion, make them displacing. An electrostatic MEMS actuator may comprise at least two electrodes on which different voltages are applied. This induces an electrostatic force between the electrodes tending to move one versus the other. A piezoelectric MEMS actuator may comprise one or more piezoelectric materials of any type and a voltage source. Applying a voltage difference on one of the piezoelectric material will deform inducing an actuation (motion).

The conduction coil may be used as the detection coil. The MEMS device may comprise a single coil, and that single coil may define both the conduction coil and the detection coil. For example, the MEMS device may comprise a single conduction coil; a drive current may be provided in the single conduction coil so that a Laplace force is applied to the MEMS mirror to tilt the MEMS mirror about the rotation axis to the predefined angular position ($\Theta$). The single conduction coil may also be used as the detection coil; the resistance of the conduction coil may be monitored to detect changes in its resistance. In an alternative embodiment the MEMS device may have two coils, one conduction coil which acts as the actuation means when conducting a drive current and a second coil which acts as the detection coil, which is mounted on the MEMS mirror and which is monitored for changes in resistance.

In the present invention a detection coil is any electrically conducting coil which is located on the MEMS and whose electrical resistance changes with changes of its own temperature. A change in the temperature of the detection coil may occur due to current flowing in the detection coil (called self-heating), and/or due to changes in temperature of the MEMS mirror, which is in thermal communication with the detection coil.

A change in temperature of the MEMS mirror will result in a change in temperature of detection coil. A change in temperature of the detection coil will result in a change in the electrical resistance of the detection coil. Accordingly a change in the resistance of the detection coil will indicate that a change in temperature of the MEMS mirror has occurred. A change in temperature of the MEMS mirror will affect the mechanical properties of the MEMS mirror; for the same force applied to the MEMS mirror by the actuation means, at different temperatures the MEMS mirror will be tilted to a different angular position.

Therefore, if MEMS mirror is tilted by a force (which is applied by the actuating means) to be static at a predefined angular position ($\Theta$), and if the temperature of the MEMS mirror is then changed, then due to the change in the mechanical properties of the MEMS mirror the MEMS mirror will become displaced from the predefined angular position ($\Theta$). Likewise if force which is applied by the actuating means to the MEMS mirror is sinusoidal so that the MEMS mirror oscillates about its rotational axis to a predefined angular position ($\Theta$) (and a predefined angular position ($-\Theta$)), then a change in temperature of the MEMS mirror will cause the MEMS mirror to oscillate to a different angular position (e.g. $\Theta+5°$ and $-\Theta-5°$). In the present invention the drive signal which is provided in the actuating means is adjusted so that the force which is applied to the MEMS mirror by the actuating means is adjusted (increased or decreased) when the temperature of the MEMS mirror changes, so that the MEMS mirror can be maintained at its predefined angular position ($\Theta$).

In the present invention the MEMS mirror is typically a planar structure and the angular position is the angle between the plane of the MEMS mirror and a reference plane. If the MEMS mirror is a curved structure then angular position is the angle between a tangent at the peak of the curve and a reference plane. Typically the reference plane is horizontal normal plane. Typically the reference plane is the plane of the MEMS mirror when the MEMS mirror is at a rest position. Preferably at rest position the MEMS mirror is in a horizontal orientation. Preferably the MEMS mirror is attached by torsional arms to a fixed frame, and the reference plane is a plane of the fixed frame.

The drive signal which is provided to the actuating means may be constant so that MEMS device is static operated and the steps of, determining the drive signal amplitude required to maintain the MEMS mirror at a predefined angular position ($\Theta$), and the method may comprise the step of, providing the actuating means with a drive signal which has an amplitude which is equal to the determined drive signal amplitude, are performed only in response to when a change in the resistance of the detection coil is detected.

A static operated MEMS mirror device is when the MEMS mirror device is operated so that the MEMS mirror is tilted to a predefined angular position and the MEMS mirror remains static at that angular position when there are no temperature changes in the MEMS device. In other words, a static operated MEMS mirror device is a MEMS mirror device which is operated so that the MEMS mirror is tilted so that it is static at a predefined angular position and does not oscillate, or have smallest as possible oscillation, about its rotational axis. The MEMS device is static operated when the drive signal to the actuating means is constant.

The step of determining the amplitude drive current required to maintain the MEMS mirror at a predefined angular position ($\Theta$), may comprise the steps of, determining the stiffness (K) of the MEMS mirror; and determining the drive current amplitude (I) using the equation:

$$I = -(((K/(n \cdot B \cdot S)) \cdot (\Theta/\cos \Theta))$$

wherein, n is the number of turns in the conduction coil, S is the area of the MEMS mirror which lies within the turns of the conduction coil (i.e. the conduction coil may be provided at concentric winding on the surface of the MEMS mirror, S is defined by the area of the MEMS mirror which is enclosed by these windings), B is the magnetic field provided by the magnet, and $\Theta$ is the predefined angular position, and I is the drive current amplitude.

In this case magnetic field B provided by the magnet is considered to be constant and/or homogeneous around the MEMS actuation and/or detection coil. The value for B (at room temperature) is normally taken from a datasheet provided by the magnet manufacturer.

The conduction coil will preferably be positioned on the MEMS mirror and will be configured as a series of concentric turns on the MEMS mirror. The conduction coil will preferably lie on a plane which is parallel to the plane of the MEMS mirror. It should be noted that the MEMS mirror may be mounted to a frame which is configured such that it can oscillate about the same axis as the MEMS mirror or other oscillation axes; in this case the conduction coil may alternatively be positioned on the frame. The frame may be attached to a second frame which can oscillate about one or more oscillation axes; and preferable the oscillation axis of the frame is orthogonal to the oscillation axis of the second frame. The second frame may have a second conduction coil which is used as an actuating means to oscillate the second frame about its oscillation axis. The second frame may use the conduction coil as a detection mean or may have a separated detection coil, on this second frame The step of determining the stiffness (K) of the MEMS mirror may comprise the steps of, determining the resistance of the detection coil; and determining the stiffness K of the MEMS mirror by using the equation:

$$K = R \cdot q$$

wherein, R is the measured resistance of the detection coil and q is a constant.

The constant q can be derived from an initial characterization of the MEMS device wherein the resistance of the detection coil is measured using any suitable resistance measuring tool and the mirror stiffness are measured or determined using appropriate means. The resistance of the detection coil can also be computed by measuring the applied current and the voltage drop on the coil, then using R=U/I equation. The measured values are used to determine q using the equation K=R·q. Assuming the actuating means comprises a conduction coil which conducts a drive current (I), the mirror stiffness may be determined by providing a known current in the conduction coil and then by measuring the mirror position ($\Theta$) with an external sensor (photodiode, camera . . . ) for example, and then determining K using the equation:

$$I = -(((K/(n \cdot B \cdot S)) \cdot (\Theta/\cos \Theta))$$

wherein B is the magnetic field provided by the magnet and S is the area of the MEMS mirror which lies within the turns of the conduction coil (i.e. the conduction coil may be provided at concentric winding on the surface of the MEMS mirror, S is defined by the area of the MEMS mirror which is enclosed by these windings). Alternatively the mirror stiffness may be determined from the resonant frequency (Fr) of the MEMS mirror using the equation Fr=($\frac{1}{2} \cdot \pi$)·($\sqrt{(K/J)}$), or by using Finite Element Modelling (FEM) simulation, or using a stiffness measurement tool. Any suitable means known in the art may be used to determine the resonant frequency (Fr) of the MEMS mirror.

The step of determining the stiffness (K) of the MEMS mirror may comprise the steps of, determining the resonant frequency (Fr) of the MEMS mirror; and, determining the MEMS mirror stiffness (K) by using the equation:

$$Fr=(1/2 \cdot \pi) \cdot (\sqrt{(K/J)})$$

wherein, J is the moment of inertia of the mirror.

Known simulation tools are typically used to determine the moment of inertia of the MEMS mirror. The simulation tools take account of properties of the MEMS mirror such as geometry, thickness and material properties to determine the moment of inertia.

The step of determining the resonant frequency (Fr) of the MEMS mirror may comprise, actuating the MEMS mirror, using a means for actuation, so that MEMS mirror oscillates about the at least one rotational axis; stopping actuating the MEMS mirror using the means for actuation so that the MEMS mirror oscillates freely about the at least one rotational axis; measuring voltage which is induced across the detection coil; determining the period of the induced voltage; determining the resonant frequency (Fr) of the MEMS mirror from the induced voltage, wherein the resonant frequency (Fr) of the MEMS mirror is equal to the inverse of the period of the induced voltage.

To determine the resonant frequency (Fr) of the MEMS mirror from the induced voltage signal Vind(t) one can measure the period of the induced voltage signal Vind(t) by measuring the time between two points (e.g. zero crossing) in the induced voltage signal; then invert the period to find resonant frequency (Fr). It will be understood that the induced voltage Vind(t) is voltage will be conducted by the detection coil preferably. In the case where the actuating means comprise a conduction coil and the same conduction coil defines the detection coil, the induced voltage signal will be conducted by the conduction coil. Another possible way to determine the resonant frequency (Fr) of the MEMS mirror from the induced voltage Vind(t) is to fit the induced voltage signal Vind(t) with a fitting curve. To do this fitting, it is considered that the induced voltage signal Vind(t) has the same shape as the mechanical motion of the mirror, as there is a direct relationship between the induced voltage and the amplitude of oscillation of the mirror. Then it is considered that the mirror is behaving as a basic second order damped mechanical oscillator, which can be modelled using a well-known second order damped mechanical oscillator equation, which can be then represented as a function of an amplitude of oscillation of the mirror which varies over time A(t). Knowing the mechanical behaviour of the mirror (second order damped mechanical structure), a fitting technique can then be used to compare both the measured induced voltage signal Vind(t) curve to a theoretical, expected, induced voltage signal Vind(t) given by the known equations for second order damped oscillators. From this comparison one can calculate the key parameters of the second order damped mechanical oscillator equation, one of them begin the resonant frequency of the mirror (Fr). For example a fitting technique using a function that find minimum of unconstrained multivariable function using derivative-free method. The advantage of the fitting technique is that the precision is higher as it is less sensitive to noise and measurement errors. Typically mathematical programs may be used to perform the above-mentioned calculations to determine the resonant frequency (Fr).

The step of determining the resonant frequency (Fr) of the MEMS mirror may comprise the steps of, actuating the MEMS mirror using the actuating means so that the MEMS mirror moves about the at least one rotational axis; stopping actuating the MEMS mirror using the actuating means so that the MEMS mirror is left to oscillate freely about the at least one rotational axis without actuation by the actuating means; measuring the speed (v) of oscillation of the MEMS mirror as it oscillates freely about the at least one rotational axis; calculating the resonant frequency (Fr) of the MEMS mirror using the equation:

$$v=-\Theta m \cdot e^{-\lambda \cdot t} \cdot 2\pi \cdot Fr \cdot \cos(\sqrt{(2\pi \cdot Fr)^2 - \lambda^2} \cdot t + \phi + \cos^{-1}(\lambda/(2\pi \cdot Fr)))$$

wherein $\lambda$ is the damping factor, t is time in seconds, $\Theta m$ is the position of the MEMS mirror at the moment the actuation of the MEMS mirror is stopped, and $\phi$ is the phase of voltage Vind(t) which is induced in the detection coil at the moment the MEMS mirror is stopped, the MEMS mirror motion sensing signal at that moment.

The damping factor $\lambda$ is a constant value (for a system in static conditions) that describes how oscillations of the MEMS mirror about its oscillation axis, will decay after a disturbance.

To determine $\lambda$, Fr, and $\phi$, a measurement of the mechanical angle or mechanical speed of the MEMS mirror as it oscillates freely about the rotational axis is used. To measure the mechanical angle of the MEMS mirror a typical technique is to use a light source which illuminates the oscillating MEMS mirror; then, sense the reflected light beam using a photodiode. Knowing the mechanical relative positioning between the photodiode, the light source and the MEMS mirror, one can then determine the oscillation angle of the mirror from the sensed reflected light. For mechanical speed, the induced voltage signal Vind(t) which is conducted in the detection coil when the MEMS mirror oscillates, is representative of the movement of the MEMS mirror. The induced voltage signal Vind(t) is directly representative of the mirror motion over time; therefore the speed of the MEMS mirror can be determined from the induced voltage signal Vind(t). As the MEMS mirror oscillates freely, the speed of the MEMS mirror follows the equation:

$$v=-\Theta m \cdot e^{-\lambda \cdot t} \cdot 2\pi \cdot Fr \cdot \cos(\sqrt{(2\pi \cdot Fr)^2 - \lambda^2} \cdot t + \phi + \cos^{-1}(\lambda/(2\pi \cdot Fr)))$$

wherein v is the speed of oscillation of the MEMS mirror. The measured speed v forms a speed signal. Having the speed signal and knowing the shape that the speed signal should have (i.e. the theoretical speed signal) according to the fact that the system behaves as a second order damped system, one can fit $\lambda$, Fr, $\Theta m$ and $\phi$. To fit these parameters, there known algorithms are used. Most of the known algorithms evaluate the sum of the squared errors (between the measured speed signal and the theoretical speed signal) for different parameters and declare that the good parameters are found when the sum is minimal.

Alternatively the resonant frequency (Fr) of the MEMS mirror may be determined using the equation:

$$\Theta(t)=\Theta m \cdot e^{-\lambda \cdot t} \cos(\sqrt{((2\pi \cdot Fr)^2 - \lambda^2)} \cdot t + \phi).$$

This equation uses angular position measurement, the method is the same as that mentioned above which uses speed measurement, and wherein the variables of the equation are the same as those mentioned above.

The step of determining the MEMS mirror stiffness (K) may comprise, one or more of: using information derived from a simulation of the MEMS mirror; using analytical equations of a second order resonating structure; and/or reading from a table which was generated in a calibration step, wherein the table comprises a plurality of MEMS mirror stiffness (K) values each corresponding to a resistance (R) of the detection coil.

The method may further comprises the step of, determining the resistance (R) of the detection coil; and wherein the step of determining the drive current amplitude required to maintain the MEMS mirror at a predefined angular position, comprises reading the drive current amplitude (I) from a table in which is stored a plurality of drive current amplitudes (I) and corresponding detection coil resistances (R) and corresponding angular positions.

The method may further comprise the step of generating the table in a calibration step, wherein the calibration step comprises, providing the conduction coil with a plurality of drive current amplitudes (I); and, for each of the plurality of drive current amplitudes (I) provided, measuring the resistance of the detection coil (R) and the angular position of the MEMS mirror.

The method may further comprise the steps of, selecting a new angular position which is different to the predefined angular position ($\Theta$); and adjusting the drive signal which is provided to the actuating means proportionally to the difference between the new angular position and predefined angular position ($\Theta$).

For example, assuming the actuating means comprises a conduction coil which conducts a drive current (I) in the magnetic field, so that a Laplace force is applied to the MEMS mirror, and wherein the drive current (I) defines the drive signal; if the new angular position is 10% greater than the predefined angular position ($\Theta$) then the drive current which is provided in the conduction coil may be adjusted by increasing the drive current. Thus, preferably any new angular position is achieved by increasing or decreasing the drive current, which is adjusted by a percentage in relation to the percentage difference between the predefined angular position ($\Theta$) and the new angular position using the method described in the following example; in this example the angle is 10% larger (i.e. 1.1*$\Theta$). To do so, the applied drive current (I) is adjusted so that it provides the new current (In) wherein the new current In is determined from the equation: In=I*(((1+(percentage increase of angular position/100))*$\Theta$/cos((1+(percentage increase of angular position/100))*$\Theta$))/($\Theta$/cos $\Theta$), where I was the applied current required to reach the predefined angular position $\Theta$). In that example the percentage increase of angular position is 10%, therefore the value used in the equation for "percentage increase of angular position/100" is 10/100=0.1.

The method may further comprise the step of, monitoring for further changes in the resistance of the detection coil; and wherein the step of adjusting the drive signal which is provided to the actuating means proportionally to the difference between the new angular position and predefined angular position ($\Theta$), is performed only when the monitoring step has detected no further changes in the resistance of the detection coil. In that case, the detection coil is acting as a regulation loop.

For example, assuming the actuating means comprises a conduction coil which conducts a drive current (I) in the magnetic field, so that a Laplace force is applied to the MEMS mirror, and wherein the drive current (I) defines the drive signal; preferably, the step of adjusting drive current proportionally to the difference between the new angular position and predefined angular position ($\Theta$), is performed only when the resistance of the detection coil has become stable. The stability of the resistance of the detection coil may be temporary; in this case the step of adjusting drive current proportionally to the difference between the new angular position and predefined angular position ($\Theta$), is performed only when the monitoring step has detected no further changes in the resistance of the detection coil within a predefined time period.

The method may further comprise the steps of, determining a change in the magnetic field (B) provided by the magnet; adjusting the amplitude of the drive current (I) which is provided in conduction coil proportionally to the change in magnetic field, so as to compensate for changes in the Laplace force applied to the MEMS mirror which have resulted from the change in the magnetic field (B).

For example, if the magnetic field B decreases by 20%, the amplitude of the drive current which is provided in the conduction coil may be adjusted by increasing it by an amount necessary to compensate for the loss in the Laplace force which has resulted from the decrease in magnetic field, so that the Laplace force is maintained constant. Likewise if the if the magnetic field B increases by 20%, the amplitude of the drive current which is provided in the conduction coil may be adjusted by decreasing it by an amount necessary to compensate for the increase in the Laplace force which has resulted from the increase in magnetic field, so that the Laplace force is maintained constant. It should be noted that the Laplace force (F) is related to the drive current (I) and magnetic field (B) by the equation:

$$d\vec{F}=I\cdot d\vec{l}\wedge\vec{B}.$$

The step of determining a change in the magnetic field B provided by the magnet, may comprise, determining a change in the resistance (R) of the detection coil; determining a change in the temperature of the detection coil based on the determined changed in resistance (R) of the detection coil, wherein the temperature of the detection coil is equal to the change in temperature of the magnet; using a relationship between the temperature and magnetic field B of the magnet to determine the change in the magnetic field B provided by the magnet using the determined change in temperature of the detection coil. Typically the manufacturer data (i.e. data detailing the properties and characteristics of the magnet) with the magnet will provide the relationship between the magnetic field and temperature of the magnet. Typically this is given as 3 ppm/° C. meaning that for each 1° C. temperature change ($\Delta T$) of the magnet the change in the magnetic field provided by the magnet ($\Delta B$) will be equal to $-3E-6$ Tesla. An initial value of the magnetic field provided by the magnet can be determined from the manufacturer data; knowing the initial value of B (provided by the manufacturer), the relationship that the manufacturer provide (i.e. $-3$ ppm/° C.) can be used to determine the magnetic field at different temperatures.

The method may comprise the step of measuring an initial magnetic field provided by the magnet, wherein the initial magnetic field is the magnetic field which is provided by the magnet before change in the resistance (R) of the detection coil is determined. The initial magnetic field may be simply read from the manufacturer data which is provide with the magnet. The initial magnetic field may be measured using for example a Hall sensor. The method may comprise the step of determining a magnetic field provided by the magnet by adding the determined change in the magnetic field to the initial magnetic field. The method may further comprise the step of measuring an initial temperature of the detection coil wherein the initial temperature of the detection coil is the temperature of the detection coil before a change in the resistance (R) of the detection coil is determined. Since the magnetic field is directly proportional to temperature (e.g. typically $-3$ ppm/° C. according to manufacture date) then the new value of the magnetic field can be calculated from the measured temperature of the detection coil.

The method may comprise the step of determining the temperature of the magnet by adding the determined change in the temperature to a prior temperature of the magnet.

Typically, the relationship between the temperature and magnetic field B of the magnet is given by a manufacturer's data which describes the properties of the magnet. Also this relationship can be derived based on the material of the magnet; It is known that in average magnetic field dependency is −3 ppm/° C., but that can vary from magnet type (NdFB or SmCo) and grade of those magnets. Preferably, the relationship may be determined by placing the magnet into temperature chamber and placing a Hall sensor next to the magnet which senses the magnetic field created by the magnet at different temperatures.

The step of determine a change in the temperature of the detection coil based on the determined changed in resistance (R) of the detection coil may comprise, using the equation: $R=\rho(L/S)$ to determine the change in the temperature of the detection coil, wherein L is the length of the detection coil, and S is the area of the MEMS mirror which lies within the turns of the conduction coil (i.e. the conduction coil may be provided at concentric winding on the surface of the MEMS mirror, S is defined by the area of the MEMS mirror which is enclosed by these windings) and $\rho=\rho o[1+\alpha(T-To)]$, wherein $\rho o$ is the value of the resistivity of the material of the detection coil used at To, and To is the temperature of the detection coil when the MEMS mirror was at its previous position and $\alpha$ is the temperature coefficient of the material of the detection coil used and T is the temperature of the detection coil.

The resistivity of the material used $\rho o$ and the temperature coefficient of the material used $\alpha$ may be determined by using methods known in the art; either theoretically knowing the material used for the detection coil (the value of $\rho o$ and the temperature coefficient of the material used $\alpha$ are well-known in the art for different materials), either experimentally measuring the resistance of the detection coil at different temperature. A curve of resistance versus temperature may then be obtained.

Values of $\rho o$ and $\alpha$ are well known for various metals are common general knowledge in the field, so the relevant values for $\rho o$ and $\alpha$ can be determined based on the type of metal which forms the detection coil (or conduction coil if the conduction coil is also used as the detection coil).

A stove may be used to determine the resistance of the detection coil for different temperatures of the detection coil. There is a linear relationship between resistance and temperature. Using the determined resistance values at different temperatures one can deduce a linear trend curve. Using the value at T=T0 (wherein T0 is any arbitrary temperature taken to define the starting temperature; typically To is taken to be 20° C. or room temperature), one can determine the slope of the trend curve and we also know the values of $\rho o$ and $\alpha$ based on the material of the detection coil and $\rho$ can be calculated using the equation $\rho=\rho_o[1+\alpha(T-T_o)]$. So, now all the parameters of the equation $R=\rho(L/S)$ are known, so that the resistance of the detection coil can be calculated.

The step of determining a change in the magnetic field B provided by the magnet, may comprise, actuating the MEMS mirror, using a means for actuation, so that the MEMS mirror oscillates about the at least one rotational axis; measuring voltage (Vind) which is induced across the conduction coil of the MEMS mirror; determining the magnetic field B provided by the magnet using the following equation:

$$Vind = n \cdot B \cdot S \cdot d/dt(\mathrm{Sin}(\Theta(t)))$$

wherein n is the number of turns in the detection coil, S is the area of the mirror which lie within the coils of the conduction coil (i.e. the conduction coil may be provided at concentric winding on the surface of the MEMS mirror, S is defined by the area of the MEMS mirror which is enclosed by these windings), and $\Theta(t)$ is the angle of oscillation of the MEMS mirror, and Vind is the voltage which is induced across the detection coil when the MEMS mirror is actuated to oscillate the rotational axis; determining the difference between the determined magnetic field B and a previous value for the magnetic field B.

The previous value for the magnetic field B may be a value for the magnetic field B which has been determined in a prior calculation using the equation $Vind(t)=n\cdot B\cdot S\cdot d/dt(\mathrm{Sin}(\Theta(t)))$. If the MEMS mirror oscillates about an oscillation axis it will undergo in sinusoidal motion, thus the induced voltage signal (Vind(t)) will also have a sinusoidal shape. Alternatively the previous value for the magnetic field B may be a value which is taken from a manufactures data which indicates the magnetic field B provided by the magnet.

All the previous mentioned methods may further be used not considering the pure mirror resonant frequency Fr (also called natural frequency), which refers to the first oscillation mode of the mirror, but considering the frequencies of an harmonic of its natural frequency, or considering one other mechanical motion modes of the mirror (for example second order, third order),

BRIEF DESCRIPTION OF THE DRAWINGS

The invention will be better understood with the aid of the description of an embodiment given by way of example only and illustrated by the figures, in which:

FIG. 4 shows a table in which is stored a plurality of drive current amplitudes (I) and corresponding conduction coil resistances (R) and corresponding angular positions ($\Theta$);

DETAILED DESCRIPTION OF POSSIBLE EMBODIMENTS OF THE INVENTION

Figure 1A:
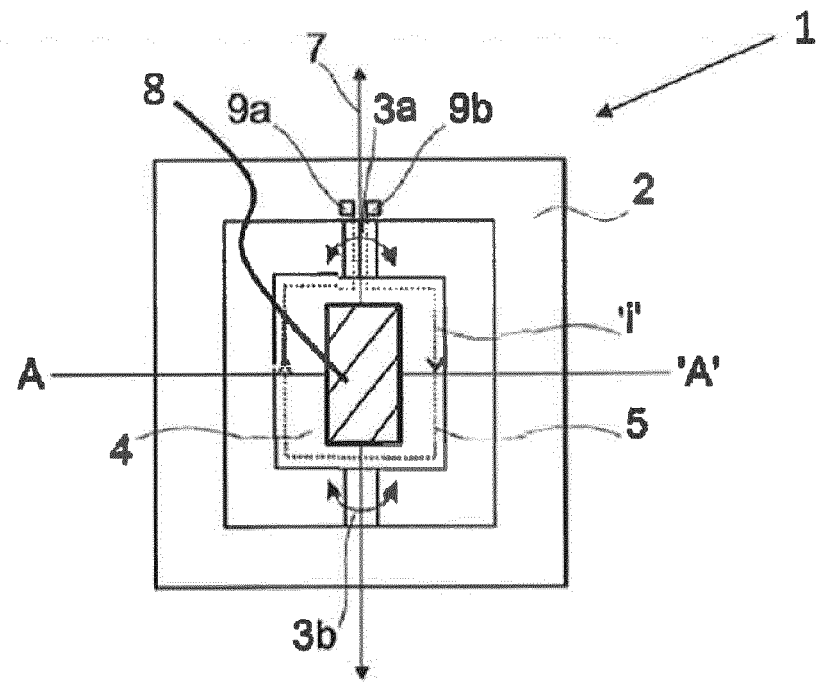
FIG. 1*a* shows an aerial view of a known MEMS micro mirror device.
Figure 1B:
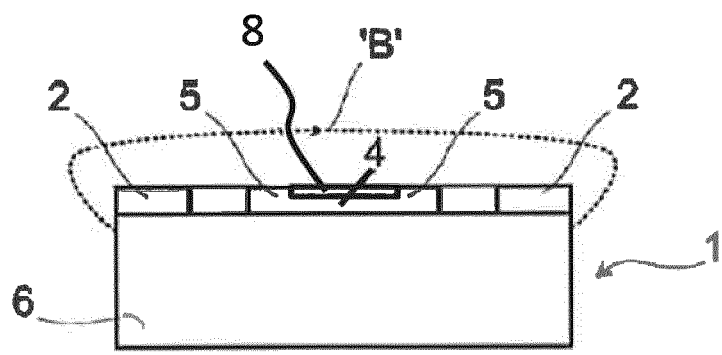
FIG. 1*b* shown a cross sectional view of the MEMS micro mirror device shown in FIG. 1*a* along A-A'.
Figure 2:
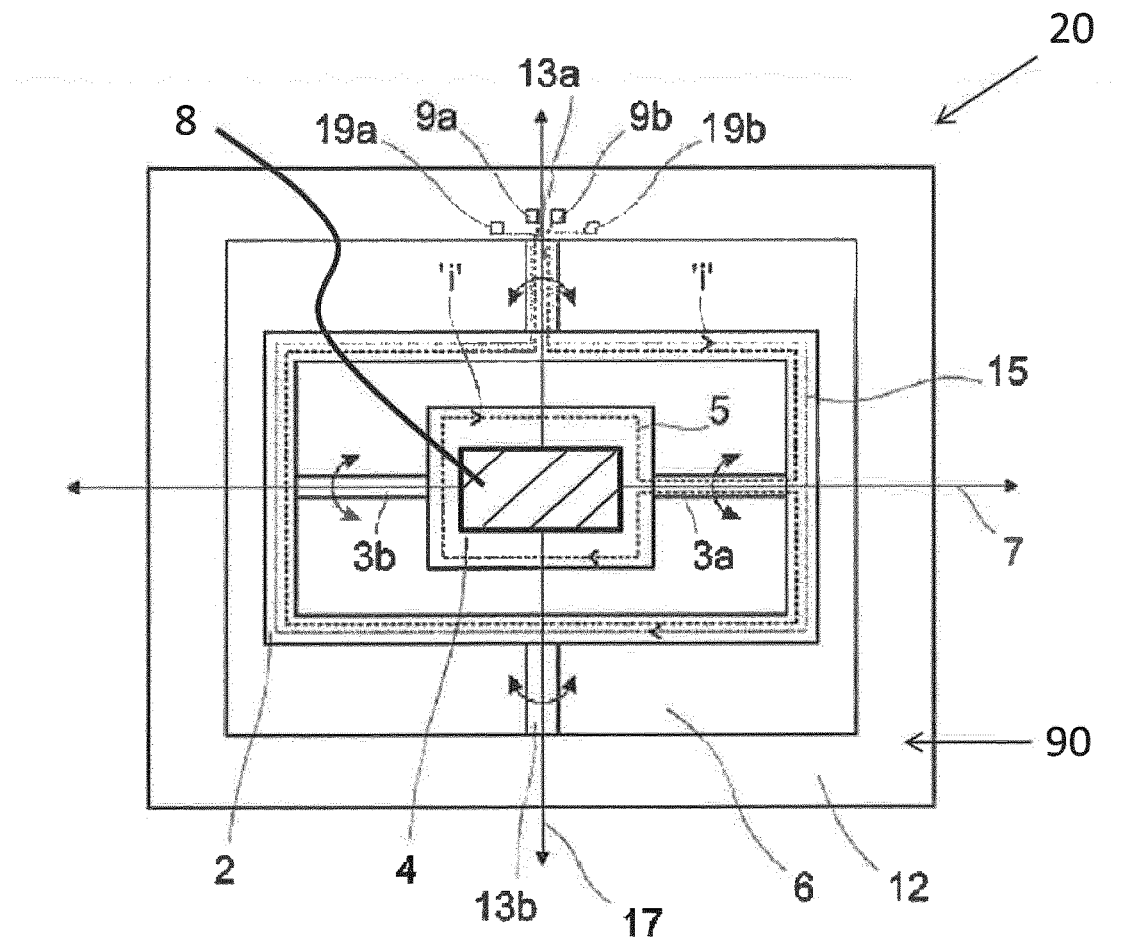
FIG. 2 shows an aerial view of another embodiment of a known MEMS micro mirror device.

FIG. 1 shows a flow chart illustrating the steps performed in a method according to a preferred embodiment of the present invention. The illustrated method is a method to control the position of a MEMS mirror in a MEMS mirror device which comprises some or all of the features of the MEMS mirror devices shown in FIGS. 1 and 2. In particular the MEMS mirror device comprises a MEMS mirror, a magnet which provides a magnetic field (B), and an actuating means in the form of an conduction coil (which also may be referred to as an conduction coil) which can conduct a drive signal in the form of a drive current for example, and which is mounted on the MEMS mirror so that a Laplace force can be generated which can tilt the MEMS mirror about at least one rotational axis. It will be understood that the actuating means may take other configuration; for example the actuating means may comprise, electrostatic material which comprises at least two electrodes to which different voltages may be applied respectively so as to induce an electrostatic force; piezo-electric material to which voltage may be applied to cause the piezo-electric material to deform; or thermal material which can expand when heated.

In this particular example the MEMS mirror device is being operated as a static MEMS mirror device before the method of the present invention is carried out; that is to say that a constant drive signal, in the form of a constant drive current for example is provided in the conduction coil so that the MEMS mirror is tilted about its at least one rotational axis to a predefined angular position ($\Theta$) and the MEMS mirror remains at this predefined angular position ($\Theta$) (i.e. does not oscillate about its rotational axis). The amplitude of the constant drive current which is provided to the conduction coil is such that the appropriate Laplace force is applied to the MEMS mirror to tilt the MEMS mirror to the predefined angular position ($\Theta$). It will be understood that the value for the predefined angular position ($\Theta$) is defined by the user; typically the predefined angular position ($\Theta$) is the angle between the horizontal normal and a plane of the MEMS mirror. More preferably the predefined angular position ($\Theta$) is the angle between a plane defined by a fixed part of the MEMS mirror device to which MEMS mirror is attached by torsional arms and the plane of the MEMS mirror. The magnitude of the Laplace force will depend on the magnitude of the drive current which is conducted in the conduction coil.

As discussed in the introduction during use the temperature of the MEMS mirror may vary causing a change in the properties of the MEMS mirror which results in the MEMS mirror becoming displaced from its predefined angular position. As the conduction coil is mounted on the MEMS mirror a change in the temperature of the MEMS mirror will cause a change in the temperature of the conduction coil; a change in the temperature of the conduction coil will cause a change in the resistance of the conduction coil. Thus, one can detect a change in the temperature in the MEMS mirror by monitoring for changes in the resistance of the conduction coil. It will be understood that the conduction coil does not need to be mounted on the MEMS mirror, any suitable cooperation between the MEMS mirror and conduction coil which allows a Laplace force to be applied to the MEMS mirror when the conduction coil is conducting a drive current and which allows thermal communication between the MEMS mirror and conduction coil, is possible. The first step of detecting a change in the resistance (R) of the conduction coil so as to detect that a change in temperature of the MEMS mirror has occurred. The detecting a change in the resistance (R) of the conduction coil preferably arises from a step of monitoring the resistance (R) of the conduction coil and.

A change in the temperature in the MEMS mirror will mean that the properties of the MEMS mirror have now changed in some way, which, unless compensated for, will cause the MEMS mirror to become displaced from its predefined angular position. The method illustrated in FIG. 3, comprises the steps of detecting a change in the resistance (R) of the conduction coil so as to detect that a change in temperature of the MEMS mirror has occurred (301); and when a change in the resistance (R) of the conduction coil is detected, the steps of, determining the drive current amplitude (I) required to maintain the MEMS mirror at the predefined angular position ($\Theta$) (302); and providing a drive current which has the determined drive current amplitude (I) in the conduction coil (303), are performed. Thus, in the method of the present invention, when a change in the resistance (R) of the conduction coil is detected the drive current is adjusted so that Laplace force is adjusted to ensure that the MEMS mirror remains at the predefined angular position ($\Theta$). For example, suppose the temperature of the MEMS mirror increases, then the stiffness of the MEMS mirror may reduce, which would otherwise cause the MEMS mirror to tilt more about its rotational axis for the same Laplace force; in the present invention the drive current is reduced so that the magnitude of the Laplace force is reduced to an appropriate level required to maintain the MEMS mirror at the predefined angular position ($\Theta$). Likewise, for example, if the temperature of the MEMS mirror decreases, then the stiffness of the MEMS mirror may increase, which would otherwise cause the MEMS mirror to tilt less about its rotational axis for the same Laplace force; in the present invention the drive current is increased so that the magnitude of the Laplace force is increased to an appropriate level required to maintain the MEMS mirror at the predefined angular position ($\Theta$).

Figure 4:
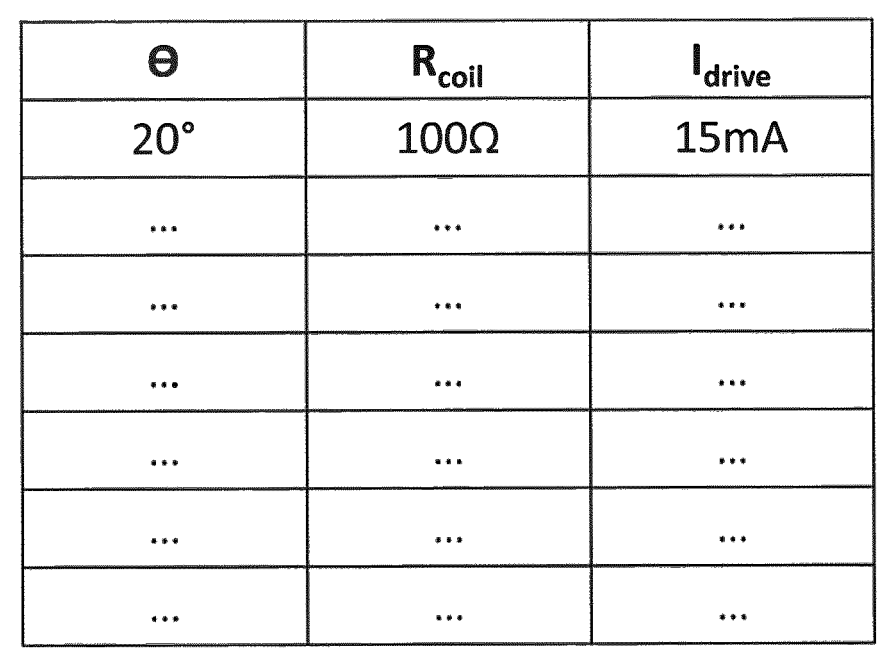

There are a number of different manners to determine the amplitude of the drive current (I) required to maintain the MEMS mirror at the predefined angular position ($\Theta$). The simplest manner is to read the drive current amplitude (I) from a table, as shown in FIG. 4, in which is stored a plurality of drive current amplitudes (I) and corresponding conduction coil resistances (R) and corresponding angular positions. One measures the resistance (R) of the conduction coil using means known in the art, and knowing the predefined angular position ($\Theta$), one can read from the table the drive current amplitude (I) which corresponds to the measured resistance and predefined angular position ($\Theta$).

Figure 3:
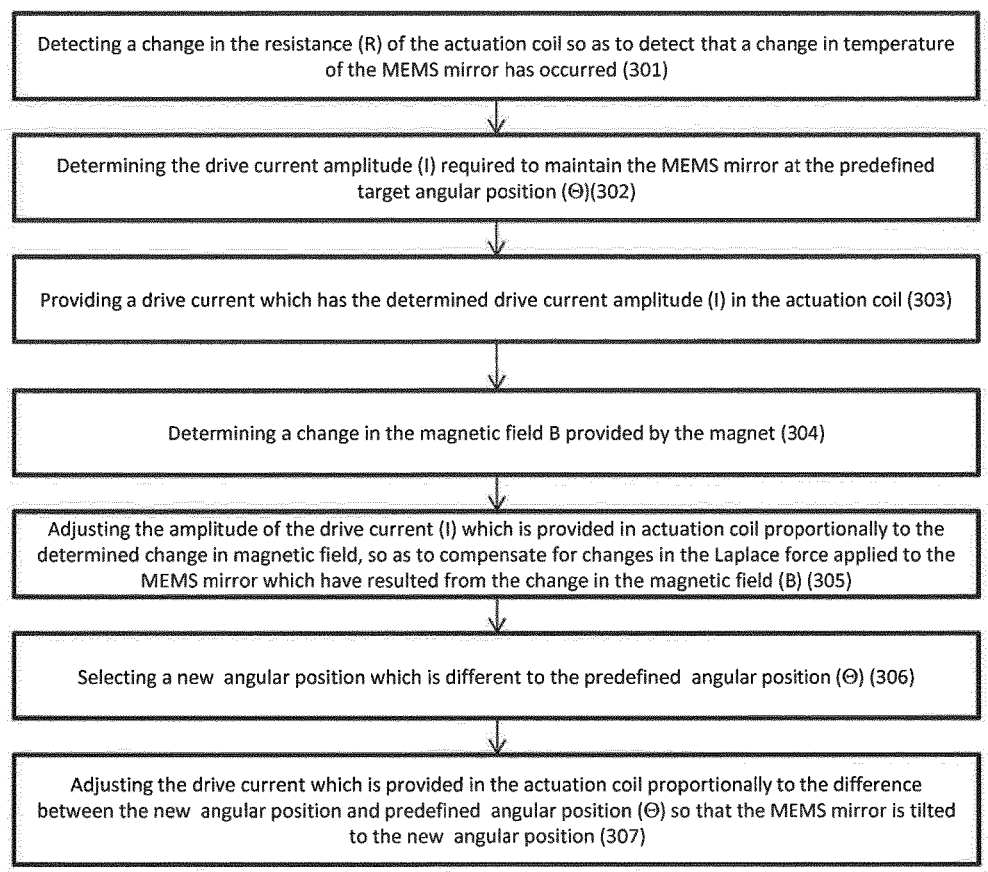
FIG. 3 shows a flow chart illustrating the steps performed in a method according to a preferred embodiment of the present invention.

The table will be generated in a calibration step, which is performed prior to performing the method illustrated in FIG. 3. The calibration step will comprise, providing the conduction coil with a plurality of different drive current amplitudes (I); and, for each of the plurality of different drive current amplitudes (I) provided in the conduction coil, measuring the resistance of the conduction coil (R) and the angular position of the MEMS mirror relative to the horizontal normal. The values for the plurality of drive current amplitudes, the resistances of the conduction coil (R), and the angular position of the MEMS mirror, are logged to generate the table.

Another way to determine the drive current required to maintain the MEMS mirror at the predefined angular position ($\Theta$) includes the performing the steps of, determining the stiffness (K) of the MEMS mirror and then determining the drive current amplitude (I) using the equation:

$$I=-(((K/(n\cdot B\cdot S))\cdot(\Theta/\cos\Theta))$$

wherein, K is the stiffness of the MEMS mirror; n is the number of turns in the conduction coil; S is the area of the MEMS mirror which lies within the turns of the conduction coil (i.e. the conduction coil may be provided at concentric winding on the surface of the MEMS mirror, S is defined by the area of the MEMS mirror which is enclosed by these windings—S defines that in which is subjected to Laplace force); B is the magnetic field provided by the magnet of the MEMS mirror device; and $\Theta$ is the predefined angular position of the MEMS mirror, and I is the drive current amplitude.

The stiffness (K) of the MEMS mirror can be determined in a number of ways. One way is to determine the MEMS mirror stiffness (K) comprises the steps of, determining the resistance of the conduction coil; and then determining the stiffness (K) of the MEMS mirror by using the equation:

$$K=R \cdot q$$

wherein, R is the determined resistance of the conduction coil and q is a constant. It will be understood that resistance of the conduction coil may be determined simply by measuring resistance of the conduction coil using any suitable means known in the art.

In this embodiment the MEMS device comprises a single conduction coil which is used as the actuating means and is also the coil from which various measurements are taken (e.g. resistance (R)); in other words the single conduction coil is also used as a detection coil. However, in a variation of the invention two independent coils may be provided in the MEMS device: one conduction coil which may be used exclusively as the actuating means (i.e. to conduct the drive current), and a second coil which defines a detection coil from which any necessary measurements are taken. For example the resistance (R) of the detection coil may be measured instead of the resistance of the conduction coil, and used in the equation K=R·q to determine the stiffness (K) of the MEMS mirror. Likewise, it will be understood that all the other measurements which are described in this description as being measured from the conduction coil may alternatively be measured from the detection coil.

The constant q can be derived from an initial characterization of the MEMS device wherein the resistance of the detection coil is measured using any suitable resistance measuring tool and the mirror stiffness are measured or determined using appropriate means. The measured values are used to determine q using the equation K=R·q. Assuming the actuating means comprises a conduction coil which conducts a drive current (I), the mirror stiffness may be determined by providing a known current on the conduction coil and then by measuring the mirror position ($\Theta$) with an external sensor (photodiode, camera . . . ) for example, and then determining K using the equation I=−(((K/(n·B·S))·($\Theta$/cos $\Theta$)) wherein B is the magnetic field provided by the magnet and S is the area of the MEMS mirror which lies within the turns of the conduction coil (i.e. the conduction coil may be provided at concentric winding on the surface of the MEMS mirror, S is defined by the area of the MEMS mirror which is enclosed by these windings—S defines that in which is subjected to Laplace force). Alternatively the mirror stiffness may be determined from the resonant frequency (Fr) of the MEMS mirror using the equation Fr=(½·π)·($\sqrt{K/J}$), or by using Finite Element Modelling (FEM) simulation, or using a stiffness measurement tool. Any suitable means known in the art may be used to determine the resonant frequency (Fr) of the MEMS mirror.

Another method to determined the stiffness (K) of the MEMS mirror is to first determine the resonant frequency (Fr) of the MEMS mirror; and, then determine the stiffness (K) of the MEMS mirror by using the equation:

$$Fr=(½\cdot\pi) \cdot (\sqrt{K/J})$$

wherein, J is the moment of inertia of the MEMS mirror. The moment of inertia (J) of the MEMS mirror is determined typically by using known simulation tools are typically used to determine the moment of inertia of the MEMS mirror. The simulation tools take account of properties of the MEMS mirror such as geometry, thickness and material properties to determine the moment of inertia.

The resonant frequency (Fr) of the MEMS mirror can be determined a number of different ways. For example, the resonant frequency (Fr) of the MEMS mirror may be determined by, first accelerating the MEMS mirror about the at least one rotational axis at a predefined angular acceleration (a), to a predefined angular position ($\Theta m$); and then calculating the resonant frequency (Fr) of the MEMS mirror using the equation:

$$v=-\Theta m \cdot e^{-\lambda \cdot t} \cdot 2\pi \cdot Fr \cdot \cos(\sqrt{(2\pi \cdot Fr)^2 - \lambda^2} \cdot t + \phi + \cos^{-1}(\lambda/(2\pi \cdot Fr)))$$

wherein $\lambda$ is the damping factor, t is time in seconds, $\Theta m$ is the position of the MEMS mirror at the moment the actuation of the MEMS mirror is stopped, and $\phi$ is the phase of voltage Vind(t) which is induced in the detection coil at the moment the MEMS mirror is stopped, the MEMS mirror motion sensing signal at that moment.

The damping factor $\lambda$ is a constant value (for a system in static conditions) that describes how oscillations of the MEMS mirror about its oscillation axis, will decay after a disturbance. To determine $\lambda$, Fr, and $\phi$, a measurement of the mechanical angle or mechanical speed of the MEMS mirror as it oscillates freely about the rotational axis is used. To measure the mechanical angle of the MEMS mirror a typical technique is to use a light source which illuminates the oscillating MEMS mirror; then, sense the reflected light beam using a photodiode. Knowing the mechanical relative positioning between the photodiode, the light source and the MEMS mirror, one can then determine the oscillation angle of the mirror from the sensed reflected light. For mechanical speed, the induced voltage signal Vind(t) which is conducted in the detection coil when the MEMS mirror oscillates, is representative of the movement of the MEMS mirror. The induced voltage signal Vind(t) is directly representative of the mirror motion over time; therefore the speed of the MEMS mirror can be determined from the induced voltage signal Vind(t). As the MEMS mirror oscillates freely, the speed of the MEMS mirror follows the equation:

$$v=-\Theta m \cdot e^{-\lambda \cdot t} \cdot 2\pi \cdot Fr \cdot \cos(\sqrt{(2\pi \cdot Fr)^2 - \lambda^2} \cdot t + \phi + \cos^{-1}(\lambda/(2\pi \cdot Fr)))$$

wherein v is the speed of oscillation of the MEMS mirror. The measured speed v forms a speed signal. Having the speed signal and knowing the shape that the speed signal should have (i.e. the theoretical speed signal) according to the fact that the system behaves as a second order damped system, one can fit $\lambda$, Fr, $\Theta m$ and $\phi$. To fit these parameters, there known algorithms are used. Most of the known algorithms evaluate the sum of the squared errors (between the measured speed signal and the theoretical speed signal) for different parameters and declare that the good parameters are found when the sum is minimal. Alternatively the resonant frequency (Fr) of the MEMS mirror may be determined using the equation:

$$\Theta(t)=\Theta m \cdot e^{-\lambda \cdot t} \cos(\sqrt{((2\pi \cdot Fr)^2 - \lambda^2)} \cdot t + \phi)$$

This equation uses angular position measurement, the method is the same as that mentioned above which uses speed measurement, and wherein the variables of the equation are the same as those mentioned above.

In this example since the MEMS mirror device is operated as a static MEMS mirror device, the step of accelerating the MEMS mirror about the at least one rotational axis at a predefined angular acceleration (a), will comprise accelerating the MEMS mirror, from a static position, about the at least one rotational axis at a predefined angular acceleration (a). Of course the MEMS mirror will be static at the predefined angular position ($\Theta$) before it is accelerated. It will be understood that the MEMS mirror may be accelerated about the at least one rotational axis at a predefined angular acceleration (a), using any suitable actuation means.

Another way to determine the resonant frequency (Fr) of the MEMS mirror comprises the steps of, actuating the MEMS mirror, using a suitable actuation means, so that MEMS mirror oscillates about the at least one rotational axis; stopping actuating the MEMS mirror using the means for actuation so that the MEMS mirror oscillates freely about the at least one rotational axis; measuring voltage which is induced across the conduction coil (or across a second detection coil); determining the period of the induced voltage; and determining the resonant frequency (Fr) of the MEMS mirror from the induce voltage, wherein the resonant frequency (Fr) of the MEMS mirror is equal to the inverse of the period of the induced current. To determine the resonant frequency (Fr) of the MEMS mirror from the induced voltage signal Vind(t) one can measure the period of the induced voltage signal Vind(t) by measuring the time between two points (e.g. zero crossing) in the induced voltage signal; then invert the period to find resonant frequency (Fr). It will be understood that the induced voltage Vind(t) is voltage will be conducted by the detection coil preferably. In the case where the actuating means comprise a conduction coil and the same conduction coil defines the detection coil, the induced voltage signal will be conducted by the conduction coil. Another possible way to determine the resonant frequency (Fr) of the MEMS mirror from the induced voltage Vind(t) is to fit the induced voltage signal Vind(t) with a fitting curve. To do this fitting, it is considered that the induced voltage signal Vind(t) has the same shape as the mechanical motion of the mirror, as there is a direct relationship between the induced voltage and the amplitude of oscillation of the mirror. Then it is considered that the mirror is behaving as a basic second order damped mechanical oscillator, which can be modelled using a well-known second order damped mechanical oscillator equation, which can be then represented as a function of an amplitude of oscillation of the mirror which varies over time A(t). Knowing the mechanical behaviour of the mirror (second order damped mechanical structure), a fitting technique can then be used to compare both the measured induced voltage signal Vind(t) curve to a theoretical, expected, induced voltage signal Vind(t) given by the known equations for second order damped oscillators. From this comparison one can calculate the key parameters of the second order damped mechanical oscillator equation, one of them begin the resonant frequency of the mirror (Fr). For example a fitting technique using a function that find minimum of unconstrained multivariable function using derivative-free method. The advantage of the fitting technique is that the precision is higher as it is less sensitive to noise and measurement errors. Typically mathematical programs may be used to perform the above-mentioned calculations to determine the resonant frequency (Fr).

In this example since the MEMS mirror device is operated as a static MEMS mirror device, the step of actuating the MEMS mirror, using a means for actuation, so that MEMS mirror oscillates about the at least one rotational axis, will comprise actuating the MEMS mirror, using a means for actuation, so that MEMS mirror oscillates, from a static position, about the at least one rotational axis. Of course the MEMS mirror will be static at the predefined angular position (Θ) before it is actuated.

The actuation means which is used to accelerate or actuation the MEMS mirror may be any suitable means for applying a force to the mirror, for example the actuation means may be a user may apply a force to the MEMS mirror with their hand directly to the MEMS mirror, or may comprise providing the conduction coil with a drive current which results in Laplace force applied to the MEMS mirror. The step of stopping actuating the MEMS mirror may simply comprise the user refraining from applying a force to the MEMS mirror or providing no drive current in the conduction coil.

Alternatively the stiffness (K) of the MEMS mirror could be determined using information derived from a simulation of the MEMS mirror; using analytical equations of a second order resonating structure; and/or reading from a table which was generated in a calibration step, wherein the table comprises a plurality of MEMS mirror stiffness (K) values each corresponding to a resistance (R) of the conduction coil (or detection coil).

During use of the MEMS mirror device the temperature of the magnet may also change; the change in temperature of the magnet will cause a change in the magnetic field B provided by the magnet. The change in the magnetic field will result in a change in the Laplace force i.e. (F=I·B, wherein F is the Laplace force, I is the drive current provided in the conduction coil, and B is the magnetic field provided by the magnet). Ultimately a change in the Laplace force would result the MEMS mirror becoming displaced from the predefined angular position (Θ). The method of the present invention compensates for the change in the magnetic field B by further adjusting the magnitude of drive current (I) provided in the conduction coil to maintain the Laplace force, thus MEMS mirror is maintained at its predefined angular position (Θ) even if magnetic field B provided by the magnet changes due to changes in the temperature of the magnet. Thus, the method illustrated in FIG. 3 further comprises the steps of, determining a change in the magnetic field B provided by the magnet (304), and, adjusting the amplitude of the drive current (I) which is provided in conduction coil proportionally to the determined change in magnetic field, so as to compensate for changes in the Laplace force applied to the MEMS mirror which have resulted from the change in the magnetic field (B) (305). For example, if the magnetic field B decreases by 20%, the amplitude of the drive current which is provided in the conduction coil may be adjusted by increasing it by an amount necessary to compensate for the loss in the Laplace force which has resulted from the decrease in magnetic field, so that the Laplace force is maintained constant. Likewise if the if the magnetic field B increases by 20%, the amplitude of the drive current which is provided in the conduction coil may be adjusted by decreasing it by an amount necessary to compensate for the increase in the Laplace force which has resulted from the increase in magnetic field, so that the Laplace force is maintained constant. It should be noted that the Laplace force (F) is related to the drive current (I) and magnetic field (B) by the equation:

$$d\vec{F} = I \cdot d\vec{l} \wedge \vec{B}$$

In this manner the Laplace force which is applied to the MEMS mirror is maintained, so that the MEMS mirror is maintained at its predefined angular position (Θ).

A change in the magnetic field may be determined in a plurality of different ways. One option for determining a change in the magnetic field B provided by the magnet, comprises first determining a change in the resistance (R) of the conduction coil (or detection coil). Next a change in the temperature of the conduction coil (or detection coil) is determined based on the determined changed in resistance (R) of the conduction coil (or detection coil), wherein the temperature of the conduction coil (or detection coil) is equal to the change in temperature of the magnet. The step of determine a change in the temperature of the detection coil based on the determined changed in resistance (R) of the detection coil may comprise, using the equation: $R=\rho(L/S)$ to determine the change in the temperature of the detection coil, wherein L is the length of the detection coil, and S is the area of the MEMS mirror which lies within the turns of the conduction coil and $\rho=\rho o[1+\alpha(T-To)]$, wherein $\rho o$ is the value of the resistivity of the material of the detection coil used at To, and To is the temperature of the detection coil when the MEMS mirror was at its previous position (i.e. the position of the MEMS mirror when a previous drive current amplitude, which is different to the drive current amplitude which is now being provided in the conduction coil, was provided in the conduction coil) and $\alpha$ is the temperature coefficient of the material of the detection coil used and T is the temperature of the detection coil.

The resistivity of the material used $\rho o$ and the temperature coefficient of the material used $\alpha$ may be determined by using methods known in the art; either theoretically, knowing the material used for the detection coil (the value of $\rho o$ and the temperature coefficient of the material used $\alpha$ are well-known in the art for different materials), or experimentally measuring the resistance of the detection coil at different temperatures. A curve of resistance versus temperature may then be obtained. Values of $\rho o$ and $\alpha$ are common general knowledge in the art for various metals, so one can deduce $\rho o$ and $\alpha$ knowing the type of metal used for the detection coil.

Next the temperature of the magnet is determined by adding the determined change in the temperature to a prior temperature of the magnet (i.e. the temperature of the magnet when a previous drive current amplitude, which is different to the drive current amplitude which is now being provided in the conduction coil, was provided in the conduction coil). Preferably the prior temperature of the magnet is the temperature of the magnet at the time the step 303 is performed. The prior temperature of the magnet is determined either from a previous iteration of the above-mentioned steps, or by a suitable temperature sensing means which directly measures the temperature of the magnet at the time the step 303 is performed, for example using a temperature sensor chip attached to the magnet.

Finally a relationship between the temperature and magnetic field B of the magnet is used to determine the magnetic field B provided by the magnet using the determined temperature of the magnet. Typically the manufacturer data (i.e. data detailing the properties and characteristics of the magnet) with the magnet will provide the relationship between the magnetic field and temperature of the magnet. Typically this is given as 3 ppm/° C. meaning that for each 1° C. temperature change ($\Delta T$) of the magnet the change in the magnetic field provided by the magnet ($\Delta B$) will be equal to −3E-6 Tesla.

Another option for determining a change in the magnetic field B provided by the magnet involves first actuating the MEMS mirror, using a means for actuation, so that the MEMS mirror oscillates about the at least one rotational axis. When the MEMS mirror oscillates bout the rotational axis a voltage (Vind) is induced across the conduction coil (or detection coil) due to the movement of the current conducting conduction coil in the magnetic field. The voltage (Vind) which is induced across the conduction coil (or detection coil) is measured. As the MEMS mirror is oscillating about the rotational axis the induced voltage (Vind) will be sinusoidal or mainly sinusoidal.

The magnetic field B which is provided by the magnet may then be determined using the following equation:

$$Vind = n \cdot B \cdot S \cdot d/dt(\mathrm{Sin}(\Theta(t)))$$

wherein n is the number of turns in the detection coil, S is the area of the mirror which lie within the coils of the conduction coil (i.e. the conduction coil may be provided at concentric winding on the surface of the MEMS mirror, S is defined by the area of the MEMS mirror which is enclosed by these windings), and $\Theta(t)$ is the angle of oscillation of the MEMS mirror, and Vind is the voltage which is induced across the detection coil when the MEMS mirror is actuated to oscillate the rotational axis.

To determine the change in the magnetic field B one determines the difference between the magnetic field B determined using the above-mentioned equation and a previous value for the magnetic field B. The previous value for the magnetic field B is preferably the magnetic field B which was provided by the magnet at the time the step 303 is performed. The previous value for the magnetic field B is may be a determined in a prior calculation using the equation:

$$Vind = n \cdot B \cdot S \cdot d/dt(\mathrm{Sin}(\Theta(t)))$$

Alternatively the previous value for the magnetic field B may be a value which is taken from a manufactures data which indicates the magnetic field B provided by the magnet.

Figure 5:
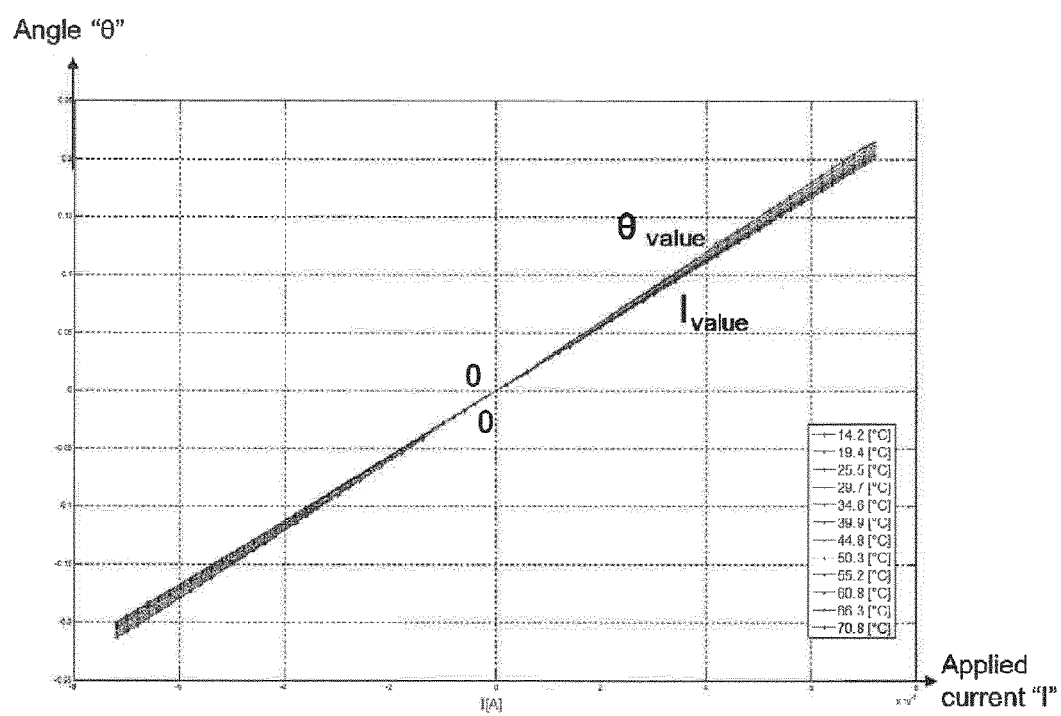
FIG. 5 is a graph illustrating how the predefined angular position ($\Theta$) of the MEMS mirror is linearly proportional to the drive current which is provided in the conduction coil for different temperatures.

The method which is illustrated in FIG. 3 may be performed on MEMS mirror device in which, once the temperature of the MEMS mirror and magnet stabilizes, the predefined angular position ($\Theta$) of the MEMS mirror is linearly proportional to the drive current which is provided in the conduction coil. FIG. 5 is a graph illustrating how the predefined angular position ($\Theta$) of the MEMS mirror is linearly proportional to the drive current which is provided in the conduction coil for different temperatures. Thus, once one has adjusted the drive current appropriately using steps 301-305 one can select a new angular position which is different to the predefined angular position ($\Theta$) (306); and preferably once the temperature of the MEMS mirror and magnet have stabilized, then adjust the drive current which is provided in the conduction coil proportionally to the difference between the new angular position and predefined angular position ($\Theta$) so that the MEMS mirror is tilted to the new angular position (307).

For example, assuming the actuating means comprises a conduction coil which conducts a drive current (I) in the magnetic field, so that a Laplace force is applied to the MEMS mirror, and wherein the drive current (I) defines the drive signal; if the new angular position is 10% greater than the predefined angular position ($\Theta$) then the drive current which is provided in the conduction coil may be adjusted by increasing the drive current. Thus, preferably any new angular position is achieved by increasing or decreasing the drive current, which is adjusted by a percentage in relation to the percentage difference between the predefined angular position ($\Theta$) and the new angular position using the method described in the following example; in this example the angle is 10% larger (i.e. 1.1*$\Theta$). To do so, the applied drive current (I) is adjusted so that it provides the new current (In) wherein the new current In is determined from the equation: $In = I * (((1+(\text{percentage increase of angular position}/100))*\Theta/\cos((1+(\text{percentage increase of angular position}/100))*\Theta))/(\Theta/\cos\Theta)$, where I was the applied current required to reach the predefined angular position $\Theta$). In that example the percentage increase of angular position is 10%, therefore the value for "percentage increase of angular position/100))" in the equation is 10/100=0.1.

As mentioned preferably the adjustment of the drive current to tilt the MEMS mirror to the new angular position is done preferably once the temperature of the MEMS mirror has stabilized. As illustrated in the example shown in FIG. 5, only when the MEMS mirror is at a constant temperature, is the relationship between the angular position (Θ) of the MEMS mirror linearly proportional to the drive current provided in the conduction coil. One preferably monitors the conduction coil (or detection coil) for further changes in the resistance of the conduction coil (or detection coil) in order to determine if the temperature of the MEMS mirror has stabilized. No changes in the resistance of the conduction coil (or detection coil) indicates that the temperature of the MEMS mirror has stabilized (since the resistance of the conduction coil (or detection coil) changes with temperature of the conduction coil (or detection coil) and the temperature of the conduction coil (or detection coil) changes with changes in temperature of the MEMS mirror). Thus, preferably the method will comprise the steps of monitoring for further changes in the resistance of the conduction coil (or detection coil); and adjusting the drive current proportionally to the difference between the new angular position and predefined angular position (Θ), only when the monitoring step has detected no further changes in the resistance of the conduction coil (or detection coil). For example, assuming the actuating means comprises a conduction coil which conducts a drive current (I) in the magnetic field, so that a Laplace force is applied to the MEMS mirror, and wherein the drive current (I) defines the drive signal; preferably, the step of adjusting drive current proportionally to the difference between the new angular position and predefined angular position (Θ), is performed only when the resistance of the detection coil has become stable. The stability of the resistance of the detection coil may be temporary; in this case the step of adjusting drive current proportionally to the difference between the new angular position and predefined angular position (Θ), is performed only when the monitoring step has detected either no further changes, or no passing over defined threshold or defined delta value, in the resistance of the detection coil within a predefined time period.

A further embodiment of the invention the method may comprise the steps of determining a change in the magnetic field (B) provided by the magnet; and adjusting the amplitude of the drive current (I) which is provided in conduction coil proportionally to the change in magnetic field, so as to compensate for changes in the Laplace force applied to the MEMS mirror which have resulted from the change in the magnetic field (B). For example, if the magnetic field B decreases by 20%, the amplitude of the drive current which is provided in the conduction coil may be adjusted by increasing it by an amount necessary to compensate for the loss in the Laplace force which has resulted from the decrease in magnetic field, so that the Laplace force is maintained constant. Likewise if the if the magnetic field B increases by 20%, the amplitude of the drive current which is provided in the conduction coil may be adjusted by decreasing it by an amount necessary to compensate for the increase in the Laplace force which has resulted from the increase in magnetic field, so that the Laplace force is maintained constant. It should be noted that the Laplace force (F) is related to the drive current (I) and magnetic field (B) by the equation:

$$d\vec{F} = I \cdot d\vec{l} \wedge \vec{B}.$$

The step of determining a change in the magnetic field B provided by the magnet, may comprises; determining a change in the resistance (R) of the detection coil; determining a change in the temperature of the detection coil based on the determined changed in resistance (R) of the detection coil, wherein the temperature of the detection coil is equal to the change in temperature of the magnet; and using a relationship between the temperature and magnetic field B of the magnet to determine the change in the magnetic field B provided by the magnet using the determined change in temperature of the detection coil. The step may further comprise adding a delay time between the time when a change in resistance occurs and the time when the temperature is taken as input information to define the change in temperature of the magnet. This is made in order to take into account the heat transfer time between the mirror and the magnet.

Typically the manufacturer data (i.e. data detailing the properties and characteristics of the magnet) with the magnet will provide the relationship between the magnetic field and temperature of the magnet. Typically this is given as 3 ppm/° C. meaning that for each 1° C. temperature change (ΔT) of the magnet the change in the magnetic field provided by the magnet (ΔB) will be equal to −3E-6 Tesla. An initial value of the magnetic field provided by the magnet can be determined from the manufacturer data; knowing the initial value of B (provided by the manufacturer), the relationship that the manufacturer provide (i.e. −3 ppm/° C.) can be used to determine the magnetic field at different temperatures.

The method may comprise the step of measuring an initial magnetic field provided by the magnet, wherein the initial magnetic field is the magnetic field which is provided by the magnet before change in the resistance (R) of the detection coil is determined. The initial magnetic field may be simply read from the manufacturer data which is provide with the magnet. The initial magnetic field may be measured using for example a Hall sensor. The method may comprise the step of determining a magnetic field provided by the magnet by adding the determined change in the magnetic field to the initial magnetic field. The method may further comprise the step of measuring an initial temperature of the detection coil wherein the initial temperature of the detection coil is the temperature of the detection coil before a change in the resistance (R) of the detection coil is determined. Since the magnetic field is directly proportional to temperature (e.g. typically −3 ppm/° C. according to manufacture date) then the new value of the magnetic field can be calculated from the measured temperature of the detection coil.

The method may comprise the step of determining the temperature of the magnet by adding the determined change in the temperature to a prior temperature of the magnet.

Typically, the relationship between the temperature and magnetic field B of the magnet is given by a manufacturers data which describes the properties of the magnet. Typically this is given as 3 ppm/° C. meaning that for each 1° C. temperature change (ΔT) of the magnet the change in the magnetic field provided by the magnet (ΔB) will be equal to −3E-6 Tesla. An initial value of the magnetic field provided by the magnet can be determined from the manufacturer data; knowing the initial value of B (provided by the manufacturer), the relationship that the manufacturer provide (i.e. −3 ppm/° C.) can be used to determine the magnetic field at different temperatures.

Also the relationship between temperature and magnetic field B for the magnet can be derived based on the material of the magnet; It is known that in average magnetic field dependency is −3 ppm/° C., but that can vary from magnet type (NdFB or SmCo) and grade of those magnets. Preferably, the relationship may be determined by placing the magnet into temperature chamber and placing a Hall sensor next to the magnet which senses the magnetic field created by the magnet at different temperatures.

The step of determine a change in the temperature of the detection coil based on the determined changed in resistance (R) of the detection coil may comprise, using the equation: $R=\rho(L/S)$ to determine the change in the temperature of the detection coil, wherein L is the length of the detection coil, and S is the area of the MEMS mirror which lies within the turns of the conduction coil and $\rho=\rho o[1+\alpha(T-To)]$, wherein $\rho o$ is the value of the resistivity of the material of the detection coil used at To, and To is the temperature of the detection coil when the MEMS mirror was at its previous position and $\alpha$ is the temperature coefficient of the material of the detection coil used and T is the temperature of the detection coil.

The resistivity of the material used $\rho o$ and the temperature coefficient of the material used $\alpha$ may be determined by using methods known in the art; either theoretically knowing the material used for the detection coil (the value of $\rho o$ and the temperature coefficient of the material used $\alpha$ are well-known in the art for different materials), either experimentally measuring the resistance of the detection coil at different temperature. A curve of resistance versus temperature may then be obtained. Values of $\rho$ and $\alpha$ are well known in the art for various metals; therefore one can identify values for $\rho$ and $\alpha$ based on the type of metal used for the detection coil.

A stove may be used to determine the resistance of the detection coil for different temperatures of the detection coil. There is a linear relationship between resistance and temperature. Using the determined resistance values at different temperatures one can deduce a linear trend curve. Using the value at T=T0 (wherein T0 is any arbitrary temperature taken to define the starting temperature; typically To is taken to be 20° C. or room temperature), one can determine the slope of the trend curve and we also know the values of $\rho o$ and $\alpha$ based on the material of the detection coil and $\rho$ can be calculated using the equation $\rho=\rho_o[1+\alpha(T-T_o)]$. So, now all the parameters of the equation $R=\rho(L/S)$ are known, so that the resistance of the detection coil can be calculated.

The step of determining a change in the magnetic field B provided by the magnet, may comprise, actuating the MEMS mirror, using a means for actuation, so that the MEMS mirror oscillates about the at least one rotational axis; measuring voltage (Vind) which is induced across the conduction coil of the MEMS mirror; determining the magnetic field B provided by the magnet using the following equation:

$$Vind = n \cdot B \cdot S \cdot d/dt(\text{Sin}(\Theta(t)))$$

wherein n is the number of turns in the detection coil, S is the area of the mirror which lie within the coils of the conduction coil (i.e. the conduction coil may be provided at concentric winding on the surface of the MEMS mirror, S is defined by the area of the MEMS mirror which is enclosed by these windings), and $\Theta(t)$ is the angle of oscillation of the MEMS mirror, and Vind is the voltage which is induced across the detection coil when the MEMS mirror is actuated to oscillate the rotational axis; determining the difference between the determined magnetic field B and a previous value for the magnetic field B.

The previous value for the magnetic field B may be a value for the magnetic field B which has been determined in a prior calculation using the equation Vind $(t)=n \cdot B \cdot S \cdot d/dt$ ($\text{Sin}(\Theta(t))$). If the MEMS mirror oscillates about an oscillation axis it will undergoing sinusoidal motion, thus the induced voltage signal (Vind) will also have a sinusoidal shape Alternatively the previous value for the magnetic field B may be a value which is taken from a manufactures data which indicates the magnetic field B provided by the magnet.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:
1. An apparatus comprising:
  a microelectromechanical system (MEMS) mirror;
  a magnet to provide a magnetic field;
  an actuator to receive a drive signal and to cooperate with the magnet to apply a force to the MEMS mirror to tilt the MEMS mirror about at least one rotational axis based in part on the drive signal;
  a detection coil coupled to the MEMS mirror; and
  a driver to provide the drive signal to the actuator, the driver to determine a change in resistance of the detection coil, determine a drive signal amplitude to maintain the MEMS mirror at a predefined angular position based in part on the change in resistance and adjust the amplitude of the drive signal based on the drive signal amplitude.
2. The apparatus of claim 1, the drive signal comprising a drive current, the actuator comprising a conduction coil to conduct the drive current in the magnetic field to apply a Laplace force to the MEMS mirror.
3. The apparatus of claim 2, wherein the conduction coil is the detection coil.
4. The apparatus of claim 2, the driver to adjust the amplitude of the drive signal in response to the change in resistance of the detection coil.
5. The apparatus of claim 2, the driver to determine the drive signal amplitude (I) based in part on the following equation:

$$I = \frac{K}{n*B*S} * \frac{\Theta}{\cos(\Theta)},$$

where K is a stiffness of the MEMS mirror, n is a number of turns in the conduction coil, S is an area of the MEMS mirror, B is the magnetic field, and 0 is the predefined angular position.
6. The apparatus of claim 5, the conduction coil to surround a portion of the MEMS mirror, S corresponding to the area of the portion of the MEMS mirror.
7. The apparatus of claim 5, the driver to:
  determine a resistance of the detection coil; and
  determine the stiffness of the MEMS mirror based in part on the determined resistance.
8. The apparatus of claim 1, the driver to:
  determine a difference between the predefined angular position and a second angular position; and
  adjust the drive signal amplitude proportionate to the difference.

9. A method comprising:

determining a change in resistance of a detection coil coupled to a microelectromechanical system (MEMS) mirror, the MEMS mirror to tilt about at least one rotational axis based in part on a drive signal and a magnetic field;

determining a drive signal amplitude to maintain the MEMS mirror at a predefined angular position based in part on the change in resistance; and adjusting the amplitude of the drive signal based on the drive signal amplitude.

10. The method of claim 9, wherein the drive signal comprising a drive current, the MEMS mirror coupled to a conduction coil to conduct the drive current in the magnetic field to apply a Laplace force to the MEMS mirror.

11. The method of claim 10, wherein the conduction coil is the detection coil.

12. The method of claim 10, comprising adjusting the amplitude of the drive signal in response to determining a change in resistance of the detection coil.

13. The method of claim 10, comprising determining the drive signal amplitude (I) based in part on the following equation:

$$I = \frac{K}{n*B*S} * \frac{\Theta}{\cos(\Theta)},$$

where K is a stiffness of the MEMS mirror, n is a number of turns in the conduction coil, S is an area of the MEMS mirror, B is the magnetic field, and Θ is the predefined angular position.

14. The method of claim 13, comprising:
determining a resistance of the detection coil; and
determining the stiffness of the MEMS mirror based in part on the determined resistance.

15. The method of claim 13, comprising:
determining a difference between the predefined angular position and a second angular position; and
adjusting the drive signal amplitude proportionate to the difference.

16. The method of claim 15, comprising:
detecting a further change in the resistance of the detection coil; and
adjusting the drive signal amplitude proportionate to the difference based on detecting the further change.

17. The method of claim 13, comprising:
determining a change in the magnetic field; and
adjusting the drive signal amplitude proportionate to the change in magnetic field.

18. The method of claim 13, comprising determining the stiffness (K) of the MEMS mirror based on the following equation:

$$Fr = \frac{1}{2} * \pi * \sqrt{\frac{K}{J}},$$

where Fr is a resonant frequency of the MEMS mirror and J is a moment of inertia of the MEMS mirror.

19. The method of claim 18, comprising:
detecting a voltage induced across the detection coil, the voltage induced based on the MEMS mirror freely oscillating about the at least one rotational axis;
determining a period of the induced voltage; and
determining the resonant frequency of the MEMS mirror based on the induced voltage and the period.

\* \* \* \* \*